United States Patent
Hahm et al.

(10) Patent No.: US 8,311,484 B2
(45) Date of Patent: Nov. 13, 2012

(54) METHOD AND SYSTEM FOR INTERFERENCE SUPPRESSION USING INFORMATION FROM NON-LISTENED BASE STATIONS

(75) Inventors: Mark Hahm, Hartland, WI (US); Wei Luo, Marlboro, NJ (US)

(73) Assignee: Broadcom Corporation, Irvine, CA (US)

( * ) Notice: Subject to any disclaimer, the term of this patent is extended or adjusted under 35 U.S.C. 154(b) by 514 days.

(21) Appl. No.: 12/573,803

(22) Filed: Oct. 5, 2009

(65) Prior Publication Data

US 2011/0065447 A1     Mar. 17, 2011

Related U.S. Application Data

(60) Provisional application No. 61/242,524, filed on Sep. 15, 2009.

(51) Int. Cl.
*H04B 1/00* (2006.01)
*H04B 15/00* (2006.01)

(52) U.S. Cl. ............ 455/63.1; 455/456.2; 455/442; 455/445; 455/560; 455/432.1; 455/436; 455/67.13; 370/331; 370/342; 370/337; 375/220

(58) Field of Classification Search ............... 455/63.1, 455/456.2, 436–437, 442, 560, 432.1, 445; 370/331, 337, 342; 375/220

See application file for complete search history.

(56) References Cited

U.S. PATENT DOCUMENTS

| | | | | |
|---|---|---|---|---|
| 7,406,065 B2* | 7/2008 | Willenegger et al. | ......... | 370/335 |
| 7,430,253 B2* | 9/2008 | Olson et al. | ............ | 375/316 |
| 7,508,864 B2* | 3/2009 | Moshavi et al. | ........ | 375/148 |
| 7,593,746 B2* | 9/2009 | Willenegger et al. | ...... | 455/522 |
| 7,751,843 B2* | 7/2010 | Butala | ................ | 455/522 |
| 7,782,987 B2* | 8/2010 | Jonsson | ............ | 375/348 |
| 7,808,937 B2* | 10/2010 | McCloud et al. | ........ | 370/286 |
| 7,822,101 B2* | 10/2010 | Reial | ................ | 375/144 |
| 7,894,774 B2* | 2/2011 | Darwood | ........ | 455/63.1 |
| 7,991,041 B2* | 8/2011 | Shim et al. | ........... | 375/148 |
| 8,005,128 B1* | 8/2011 | Lamba et al. | ........ | 375/144 |
| 8,099,123 B2* | 1/2012 | Tomasin et al. | ........ | 455/522 |
| 2011/0090996 A1 | 4/2011 | Hahm et al. | | |

* cited by examiner

*Primary Examiner* — Marceau Milord
(74) *Attorney, Agent, or Firm* — Sterne, Kessler, Goldstein & Fox P.L.L.C.

(57) ABSTRACT

Aspects of a method and system for interference suppression using information from non-listened base stations are provided. In this regard, one or more circuits in a wireless communication device may be operable to receive a raw signal comprising one or more desired signals from one or more serving base transceiver stations (BTSs) and comprising one or more undesired signals from one or more non-listened BTSs. The one or more circuits may be operable to generate first estimate signals that estimate the one or more undesired signals as transmitted by the one or more non-listened BTSs, generate an interference suppressed version of the raw signal based on the first estimate signals, and recover the one or more desired signals from the interference suppressed version of the raw signal. The non-listened BTSs may comprise one or more BTSs that are not serving the wireless communication device and are not involved in a handoff of the wireless communication device.

20 Claims, 5 Drawing Sheets

METHOD AND SYSTEM FOR INTERFERENCE SUPPRESSION USING INFORMATION FROM NON-LISTENED BASE STATIONS

CROSS-REFERENCE TO RELATED APPLICATIONS/INCORPORATION BY REFERENCE

This patent application makes reference to, claims priority to and claims benefit from U.S. Provisional Patent Application Ser. No. 61/242,524 filed on Sep. 15, 2009.

This application also makes reference to:
U.S. patent application Ser. No. 12/582,771, filed on Oct. 21, 2009;
U.S. patent application Ser. No. 12/604,978, filed on Oct. 23, 2009;
U.S. Patent Application Ser. No. 61/242,524, filed on Sep. 15, 2009;
U.S. patent application Ser. No. 12/573,803, filed on Oct. 5, 2009;
U.S. patent application Ser. No. 12/604,976, filed on Oct. 23, 2009;
U.S. Patent Application Ser. No. 61/246,797, filed on Sep. 29, 2009;
U.S. patent application Ser. No. 12/575,879, filed on Oct. 8, 2009;
U.S. patent application Ser. No. 12/615,237, filed on Nov. 9, 2009;
U.S. Patent Application Ser. No. 61/288,008, filed on Dec. 18, 2009;
U.S. Patent Application Ser. No. 61/242,554, filed on Sep. 15, 2009;
U.S. patent application Ser. No. 12/612,272, filed on Nov. 4, 2009;
U.S. patent application Ser. No. 12/575,840, filed on Oct. 8, 2009;
U.S. patent application Ser. No. 12/605,000, filed on Oct. 23, 2009;
U.S. patent application Ser. No. 12/543,283, filed on Aug. 18, 2009;
U.S. patent application Ser. No. 12/570,736, filed on Sep. 30, 2009;
U.S. patent application Ser. No. 12/577,080, filed on Oct. 9, 2009; and
U.S. patent application Ser. No. 12/603,304, filed on Oct. 21, 2009;

Each of the above reference applications is hereby incorporated herein by reference in its entirety.

FIELD OF THE INVENTION

Certain embodiments of the invention relate to networking. More specifically, certain embodiments of the invention relate to a method and system for interference suppression using information from non-listened base stations.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo-noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, MU_1, may be engaged in a communication session with a user utilizing a mobile communication device MU_2 via a base transceiver station, BTS_A within wireless communication network. For example, the mobile communication device MU_1 may transmit a digital signal to the BTS_A, which the base transceiver station BTS_A may then transmit to the mobile communication device MU_2. The base transceiver station BTS_A may encode signals received from the mobile communication device MU_2 and transmitted to the mobile communication device MU_2 by utilizing a Walsh code, W_12, and a PN sequence, PN_A. The mobile communication device MU_2 may receive signals transmitted concurrently by a plurality of base transceiver stations (BTSs) in addition to the base transceiver station BTS_A within a given RF coverage area. The mobile communication device MU_2 may process the received signals by utilizing a descrambling code that is based on the PN sequence PN_A and a despreading code that is based on the Walsh code W_12. In doing so, the mobile communication device MU_2 may detect a highest relative signal energy level for signals received from base transceiver station BTS_A, which comprise a digital signal corresponding to mobile communication device MU_1.

However, the mobile communication device MU_2 may also detect signal energy from the digital signals, which correspond to signals from mobile communication devices other than the mobile communication device MU_1. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU_2. This aggregate noise signal energy level may be referred to as multiple access interference (MAI). The MAI may result from signals transmitted by the base transceiver station BTS_A, which originate from signal received at the base transceiver station BTS_A from mobile communication devices other than mobile communication device MU_1. The MAI may also result from signals transmitted by the base transceiver stations BTSs other than the base transceiver station BTS_A. The MAI and other sources of noise signal energy may interfere with the ability of MU_2 to successfully decode signals received from MU_1.

An additional source of noise signal energy may result from multipath interference. The digital signal energy corresponding to the mobile communication device MU_2, which is transmitted by the base transceiver station BTS_A may disperse in a wavefront referred to as a multipath. Each of the components of the multipath may be referred to as a multipath signal. Each of the multipath signals may experience a different signal propagation path from the base transceiver station BTS_A to the mobile communication device MU_2. Accordingly, different multipath signals may arrive at different time instants at the mobile communication device MU_2. The time duration, which begins at the time instant that the first multipath signal arrives at the mobile communication device MU_2 and ends at the time instant that the last multipath signal arrives at the mobile communication device MU_2 is referred to as a delay spread. The mobile communication device MU_2 may utilize a rake receiver that allows the mobile communication device MU_2 to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for interference suppression using information from non-listened base stations, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
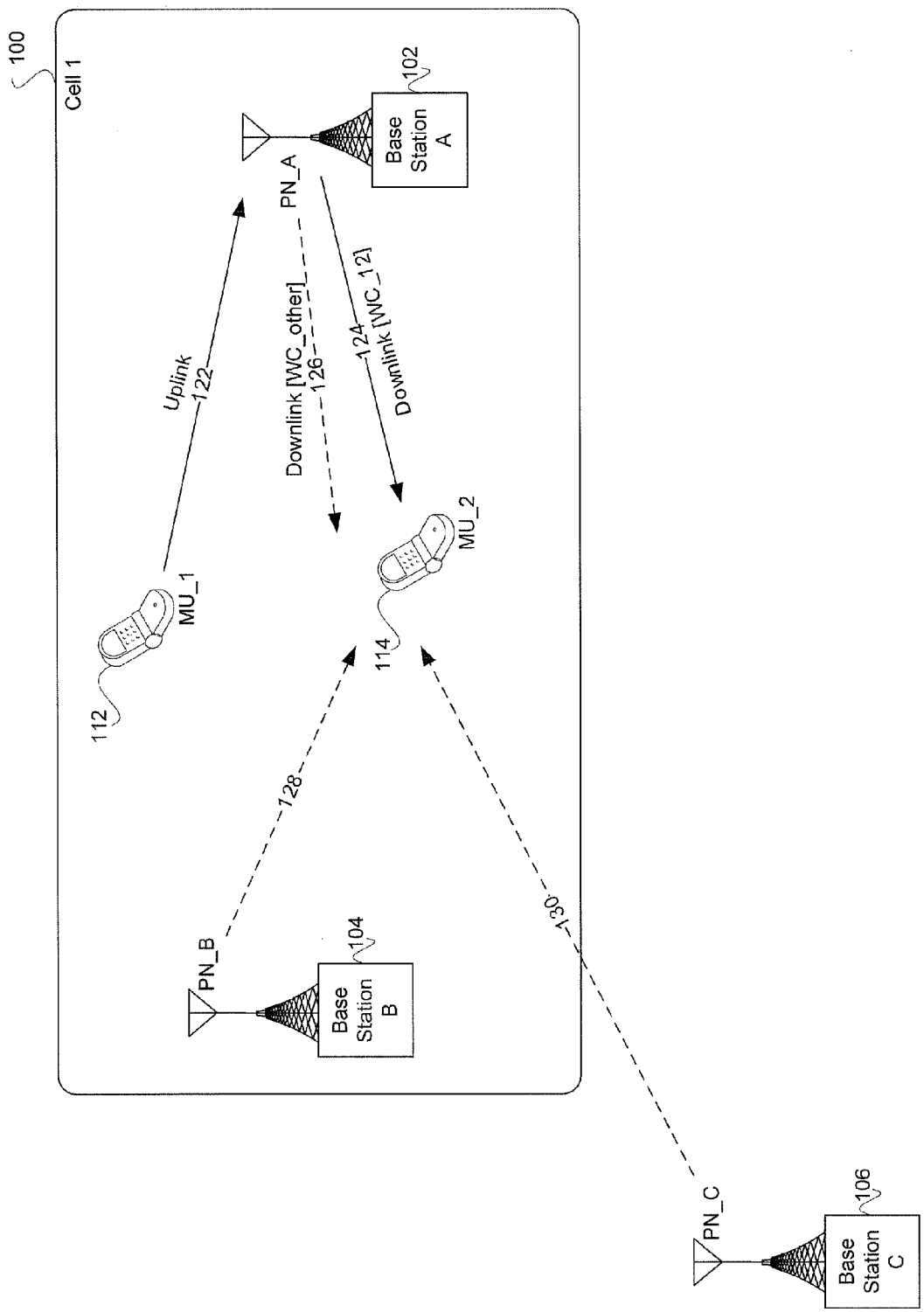
FIG. 1 is a diagram illustrating an exemplary wireless communication system, which is operable to provide interference suppression in WCDMA, in accordance with an embodiment.

Certain embodiments of the invention may be found in a method and system for interference suppression using information from non-listened base stations. In various embodiments of the invention, one or more circuits in a wireless communication device may be operable to receive a raw signal comprising one or more desired signals from one or more serving base transceiver stations (BTSs) and comprising one or more undesired signals from one or more non-listened BTSs. The one or more circuits may be operable to generate first estimate signals that estimate the one or more undesired signals as transmitted by the one or more non-listened BTSs, generate an interference suppressed version of the raw signal based on the first estimate signals, and recover the one or more desired signals from the interference suppressed version of the raw signal. The non-listened BTSs may comprise one or more BTSs that are not serving the wireless communication device and are not involved in a handoff of the wireless communication device. The raw signal may be as received over-the-air and may comprise, for example, signals for one or more users of one or more BTSs, signals from one or more handsets, and/or signals from non-cellular sources. Furthermore, the various signals that make up the raw signal may each be received via one or more paths. Generating the first estimate signals may comprise generating a plurality of potential user signals from the one or more undesired signals received from the one or more non-listened BTSs, and scaling each of the plurality of potential user signals by a corresponding one of a plurality scaling factors. The plurality of scaling factors may be generated based on power and noise detected in the plurality of potential user signals.

A first portion of the one or more circuits may be dynamically allocated for processing the one or more desired signals received from the one or more serving BTS, and a second portion of the one or more circuits may be dynamically allocated for processing the one or more undesired signals received from the one or more non-listened BTSs. The first portion of the one or more circuits may be configured based on one or more scrambling codes associated with the one or more serving BTSs. The second portion of the one or more circuits may be configured based on one or more scrambling codes associated with the one or more non-listened BTSs. A third portion of the one or more circuits may be dynamically allocated for processing one or more undesired signals received from one or more serving BTSs. The third portion of the one or more circuits may generate second estimate signals that estimate the one or more undesired signals as transmitted by the one or more serving BTSs, and the interference suppressed version of the raw signal may be generated based on the second estimate signals. A third portion of the one or more circuits may be dynamically allocated for processing undesired signals received from one or more handoff BTSs. The third portion of the one or more circuits may generate second estimate signals that estimate the one or more undesired signals as transmitted by the one or more handoff BTSs, and the interference suppressed version of the raw signal may be generated based on the second estimate signals.

FIG. 1 is an illustration of an exemplary wireless communication system, in accordance with an embodiment.

Referring to FIG. 1, there is shown cell 100 comprising BTSs 102 and 104, and a BTS 106. Also shown are mobile communication devices MU_1 112 and MU_2 114.

The mobile communication devices MU_1 112 and MU_2 114 may be engaged in a communication via the BTS A 102. The mobile communication device MU_1 112 may transmit signals to the BTS A 102 via an uplink RF channel 122. In response, the BTS A 102 may transmit signals to the mobile communication device MU_2 114 via a downlink RF channel 124. Signals transmitted by the BTS A 102 may comprise chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the BTS A 102 via the downlink RF channel 124 from signals transmitted concurrently by the BTS A 102 via other downlink RF channels, for example downlink RF channel 126. The BTS ion A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128, and RF channel 130. As stated above, signals received via RF channel 126 may be transmitted by the BTS A 102. The signals received via RF channel 128 may be transmitted by the BTS B 104. The signals transmitted by the BTS n 104 may be scrambled based on a scrambling code PN_B. The signals received via RF channel 130 may be transmitted by the BTS C 106. The signals transmitted by the BTS C 106 may be scrambled based on a scrambling code PN_C.

The mobile communication device MU_2 114 may be operable to perform a soft handoff from the current serving BTS A 102 to any of a plurality of BTSs located within the cell 100, for example, the BTS B 104. Accordingly, the mobile communication device MU_2 114 may be operable to process received signals based on scrambling code PN_A and/or scrambling code PN_B. In this regard, the mobile communication device MU_2 114 may send data to the BTS A 102 and/or the BTS B 104, and data destined for mobile communication device MU_2 114 may be received via the BTS A 102 and/or the BTS B 104. Thus, the BTS A 102 and the BTS B 104 may be referred to as "listened" BTSs. Conversely, the mobile communication device MU_2 114 may not be operable to perform a soft handoff from the current serving BTS A 102 to a BTS that is outside of the cell 100—the BTS C 106, for example. In this regard, the mobile communication device MU_2 114 may not transmit data to the BTS C 106 or receive data destined for the mobile communication device MU_2 114 from the BTS C 106.

Accordingly, the BTS C 106 may be referred to as a "non-listened" BTS.

While the desired signal at the mobile communication device MU_2 114 may be received via RF channel 124, the mobile communication device MU_2 114 may also receive signal energy via the RF channels 126 and 128. The received signal energies from the RF channels 126 and/or 128 may result in MAI, which may interfere with the ability of the mobile communication device MU_2 114 to receive desired signals via RF channel 124. Accordingly, in various aspects of the invention, the mobile communication device MU_2 114 is operable to suppress interference resulting from undesired signals transmitted by listened BTSs. Additionally, even though the BTS is not a listened BTS, information transmitted on the RF channel 130—data transmitted to mobile communication devices other than mobile communication device MU_2 114—may nevertheless interfere with the desired signals on the RF channel 124. Accordingly, in various aspects of the invention, the mobile communication device MU_2 114 is operable to suppress interference from the non-listened BTS 106, or non-listened BTSs.

Although FIG. 1 depicts communication between two mobile devices via a single BTS, the invention is not so limited. For example, aspects of the invention may be equally applicable regardless of the origin of data communicated wirelessly to the mobile communication device 114.

Figure 2:
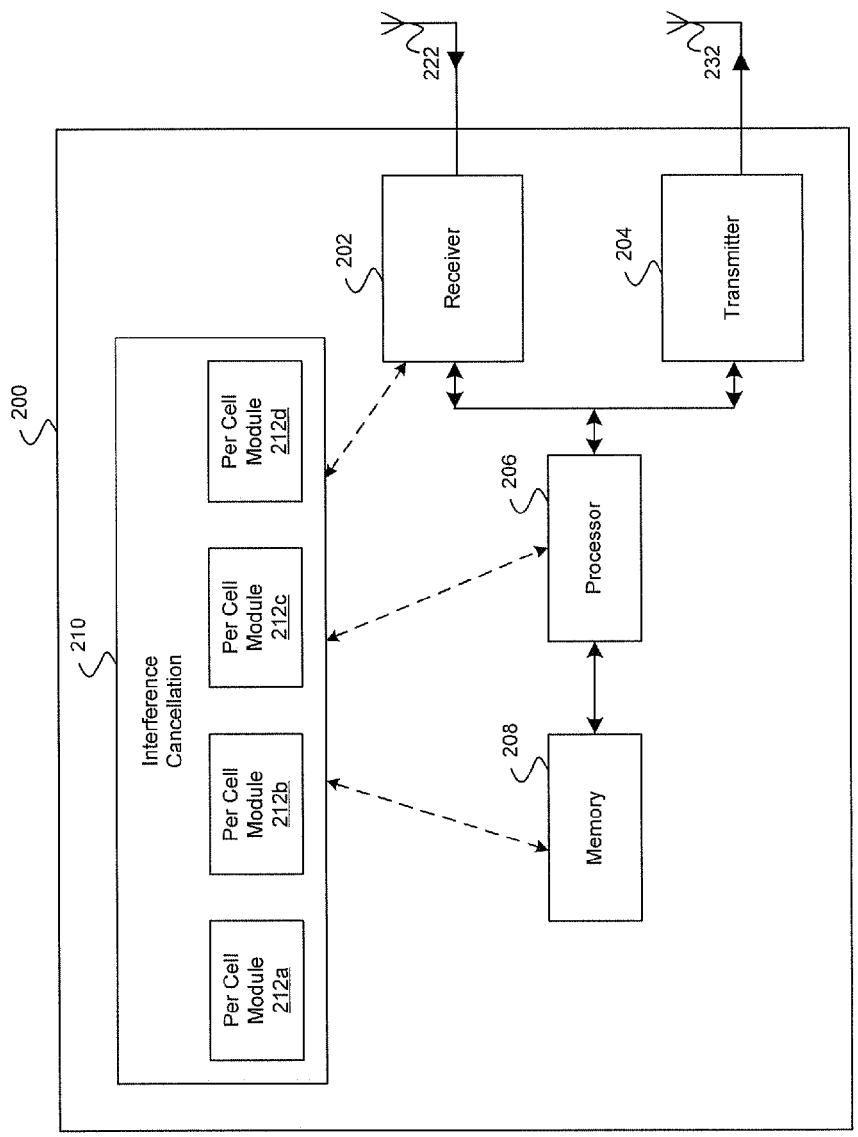
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222, and a transmitting antenna 232. The transceiver system 200 may comprise a receiver 202, a transmitter 204, a processor 206, an interference cancellation module 210 and a memory 208. The interference cancellation module 210 may comprise a plurality of per cell modules 212a, 212b, 212c and 212d. Although a separate receiver 202 and transmitter 204 are illustrated by FIG. 2, the invention is not limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise one or more desired signals and one or more interference signals. The interference cancellation module 210 may generate an interference suppressed versions of the one or more signals in which the signal level for the interference signals is reduced relative to the signal level for the desired signal. In this regard, the interference suppressed version of the signal may be an estimate of the signal as transmitted.

Each of the per-cell modules 212a, 212b, 212c, and 212d may comprise suitable logic, circuitry, interfaces, and/or code that may be operable to generate an interference suppressed version of a signal received from a particular listened or non-listened BTS. Each of the per-cell modules 212a, 212b, 212c and 212d may be associated with a particular signal source, where the signal source may be identified by a particular PN sequence and may correspond to a particular transmit antenna of a particular BTS. In this regard, each of the per-cell modules 212a, 212b, 212c, and 212d may be individually configured with a PN sequence corresponding to the associated BTS. In generating a an interference suppressed version of a received signal, each of the per-cell modules 212a, 212b, 212c and 212d may be operable to perform a weighting iteration, one or more weighting and addback iterations, and/or an addback iteration on the received signal.

In operation, the receiver 202 may receive signals via the receiving antenna 222. In various embodiments of the invention, the receiver 202 may utilize a plurality of receiving antennas. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. In instances where the receiver 202 utilizes a plurality of receiving antennas, the receiver 202 may associate each of the plurality of multipath signals with a receiving antenna through which the multipath signals was received by the receiver 202. Based on received multipath signals, the receiver 202 may generate chip-level baseband signals.

The receiver 202 may communicate the chip-level baseband signals and/or generated timing information to the interference cancellation module 210. The rake receiver 202 may generate one or more descrambled baseband signals for each receive antenna utilized by the receiver 202 based on a corresponding selected one or more PN sequences. The descrambled baseband signals and/or generated timing information may be communicated to the processor 206. For example, referring to FIG. 1, the rake receiver 202 associated with mobile communication device MU_2 may select a PN sequence, PN_A, which may then be utilized to generate the descrambled baseband signals from the chip-level baseband signal. The descrambled baseband signals communicated to the processor 206 may comprise common pilot channel (CPICH) information.

In instances where the receiver 202 utilizes a plurality of receiving antennas, the receiver 202 may generate one or more descrambled baseband signals for each receiving antenna based on the corresponding multipath signals received by the receiver 202. Each of the descrambled baseband signals, generated from signals received via a corresponding receiving antenna, may be respectively communicated to the processor 206.

The processor 206 may utilize CPICH information to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given transmit antenna of a given BTS and received at a finger in the rake receiver via a given receiving antenna. The computed channel estimate values may be represented as a channel estimate matrix, $H_{bts,rx,fgr}$, where bts represents a numerical index that is associated with a given BTS, rx represents a numerical index that is associated with a given receiving antenna, and fgr is a numerical index that is associated with a given rake finger. The processor 206 may be operable to communicate the computed channel estimate values to the receiver 202 and/or to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may identify one or more BTSs with which the transceiver 200 may communicate. The one or more BTSs may comprise a current serving BTS and one or more handoff BTSs. The processor 206 may determine a PN sequence for each of the identified one or more BTSs. The processor 206 may configure one or more of the per-cell modules 212a, 212b, 212c and 212d with a corresponding selected one or more PN sequences, wherein each selected PN sequence may be selected from the set of determined PN sequences.

In various embodiments of the invention, the processor 206 may identify one or more BTSs, which with respect to the transceiver 200, are neither a current serving BTS nor a handoff BTS. These base stations may be referred to as non-listened BTSs. The processor 206 may determine a PN sequence for each identified non-listened BTS. The processor 206 may configure one or more of the per-cell modules 212a, 212b, 212c and 212d with a corresponding selected PN sequence for one or more non-listened BTSs.

The processor 206 may also determine the number of receiving antennas, which are utilized by the transceiver 200 to receive signals. For each receiving antenna, the processor 206 may configure a corresponding plurality of per-cell modules 212a, 212b, 212c and 212d with a PN sequence selected from the set of determined PN sequences.

The following is a discussion of exemplary operation for the per-cell module 212a. The operation of per-cell modules 212b, 212c and 212d is substantially similar to the operation of per-cell module 212a as described below.

The processor 206 may also configure the per-cell module 212a with interference cancellation parameter values. In various embodiments of the inventions, the interference cancellation parameter values configured for per-cell module 212a may be equal to corresponding interference cancellation parameter values utilized by other per-cell modules 212b, 212c and 212d. In other embodiments of the invention, the interference cancellation parameter values configured for the per-cell module 212a may be selected independently from the corresponding interference cancellation parameter values utilized by other per-cell modules 212b, 212c and 212d.

The processor 206 may associate one or more rake fingers with the per-cell module 212a. The processor 206 may communicate the channel estimate values, $H_{bts,rx,fgr}$, corresponding to each finger, fgr, associated with the per-cell module 212a. The receiver 202 may communicate timing information for each corresponding rake finger. The processor 206 may configure the per-cell module 212a with a PN sequence corresponding to a BTS.

In an exemplary embodiment of the invention, the processor 206 may configure the per-cell module 212a with the PN sequence for a serving BTS 102, for example PN_A. Accordingly, the receiver 202 may communicate channel estimate values, $H_{bts,rx,fgr}$, and timing information for signals transmitted via RF channel 124 and received via receiving antenna 222 for each corresponding finger in the rake receiver that is associated with the per-cell module 212a. The per-cell module 212a may generate and/or retrieve a plurality of OVSF codes and/or one or more interference cancellation parameter values in the memory 208. In various embodiments of the invention, the plurality of OVSF codes may comprise one or more OVSF codes, which may potentially be utilized by the BTS 102 to generate signals transmitted via RF channel 124. In an exemplary embodiment of the invention, the plurality of OVSF codes comprises 256 distinct Walsh codes. While the per-cell module 212a is associated with the serving BTS 102, each of the remaining per-cell modules 212b, 212c, and 212d may be associated with a different listening or non-listening BTS.

In another exemplary embodiment of the invention, the processor 206 may configure the per-cell module 212a with the PN sequence for a handoff BTS 104, for example PN_B. Accordingly, the receiver 202 may communicate channel estimate values, $H_{bts,rx,fgr}$, and timing information for signals transmitted via RF channel 128 and received via receiving antenna 222 for each corresponding finger in the rake receiver that is associated with the per-cell module 212a. While the per-cell module 212a is associated with the handoff BTS 104, each of the remaining per-cell modules 212b, 212c, and 212d may be associated with a different listening or non-listening BTS.

In another exemplary embodiment of the invention, the processor 206 may configure the per-cell module 212a with the PN sequence for a non-listened BTS 106, for example PN_C. Accordingly, the receiver 202 may communicate channel estimate values, $H_{bts,rx,fgr}$, and timing information for signals transmitted via RF channel 130 and received via receiving antenna 222 for each corresponding finger in the rake receiver that is associated with the per-cell module 212a. While the per-cell module 212a is associated with the non-listened BTS 104, each of the remaining per-cell modules 212b, 212c, and 212d may be associated with a different listening or non-listening BTS.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may configure the per-cell module 212a, as described above, to receive signals via the receiving antenna 222_1, while the processor 206 configures the per-cell module 212b, as described above, to receive signals via the receiving antenna 222_2.

In a transceiver system 200, which utilizes receive diversity, the processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. The receiver 202 may generate a first set of timing information for signals received via the receiving antenna 222_1 and the receiver 202 may generate a second set of timing information for signals received via the receiving antenna 222_2. In various embodiments of the invention, which utilize receive diversity, the receiver 202 and/or the interference cancellation module 210 may also process signals that are transmitted by BTSs, which utilize signal transmission diversity.

After being configured for interference cancellation operation, the per-cell module 212a may receive one or more multipath signals from the receiver 202 via a corresponding one or more rake fingers that are associated with the per-cell module 212a. The signals received by the per-cell module 212a may comprise chip-level baseband signals. The per-cell module 212a may combine the received one or more chip-level signals by utilizing the corresponding channel estimate values, and/or the corresponding timing information, based on, for example, maximal ratio combining (MRC) and/or equal gain combining (EGC). The per-cell module 212a may utilize the configured PN sequence to descramble the combined chip-level signal. Based on this descrambling of the combined signals, the per-cell module 212a may generate descrambled signals.

The per-cell module 212a may process the descrambled signals by utilizing each of the plurality of OVSF codes to generate a corresponding plurality of symbol-level signals. Each symbol-level signal associated with an OVSF code may be referred to herein as a corresponding user signal, although it should be noted that multiple OVSF codes may be associated with a single user and thus there is not necessarily a one-to-one correspondence between OVSF codes and users. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile telephone MC_2 114.

The per-cell module 212a may compute a signal power level value and a noise power level value corresponding to each of the user signals. Based on the computed signal power level value, noise power level value and the one or more interference cancellation parameter values, the per-cell module 212a may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as illustrated by the following equations:

$$z_j \cong \frac{\lambda x_j^2}{\lambda x_j^2 + y_j^2} \quad [1a]$$

when $$x_j^2 > \gamma y_j^2 \quad [1b]$$

and:

$$z_j = 0 \quad [1c]$$

when $$x_j^2 < \gamma y_j^2 \quad [1d]$$

where $z_j$ represents the weighting factor value for the $j^{th}$ user signal and j may be, for example, an integer from 0 to J; $x_j^2$ represents the signal power level value for the $j^{th}$ user signal, which was generated by descrambling a received signal based on a PN sequence for the given BTS and despreading the descrambled signal utilizing the OVSF code associated with the $j^{th}$ user; $y_j^2$ represents the noise power level value for the $j^{th}$ user signal, which was generated by descrambling the received signal based on the PN sequence for the given BTS and despreading the descrambled signal utilizing the OVSF code associated with the $j^{th}$ user; and $\lambda$ and $\gamma$ represent interference cancellation parameter values.

The weighting factor values $z_j$ may correspond to a signal to noise ratio (SNR) measure for the $j^{th}$ user signal. Values for $z_j$ may be within the range $0 \leq z_j^2 \leq 1$. In one regard, values of $z_j$ may be an a priori measure of confidence that a given user signal comprises valid signal energy that was transmitted by the BTS.

In various embodiments of the invention, the per-cell module 212a may be operable to process received chip-level signals by performing a weighting iteration, one or more weighting and addback iterations and an addback iteration. During the weighting iteration, the per-cell module 212a may receive a chip-level multipath signal from each associated finger and generate a corresponding estimated chip-level signal for each associated finger. During the one or more weighting and addback iterations, the per-cell module 212a may receive a residual chip-level signal from each associated finger and generate a corresponding incremental chip-level signal for each associated finger. During the addback iteration, the per-cell module 212a may receive an updated residual chip-level signal from each associated finger and generate a corresponding interference suppressed chip-level signal for each associated finger. The interference suppressed chip-level signal may correspond to an interference suppressed version of the received multipath signal. The interference suppressed chip-level signals may be output to each corresponding rake finger. Each of the rake fingers may then process its respective interference suppressed chip-level signals.

Figure 3:
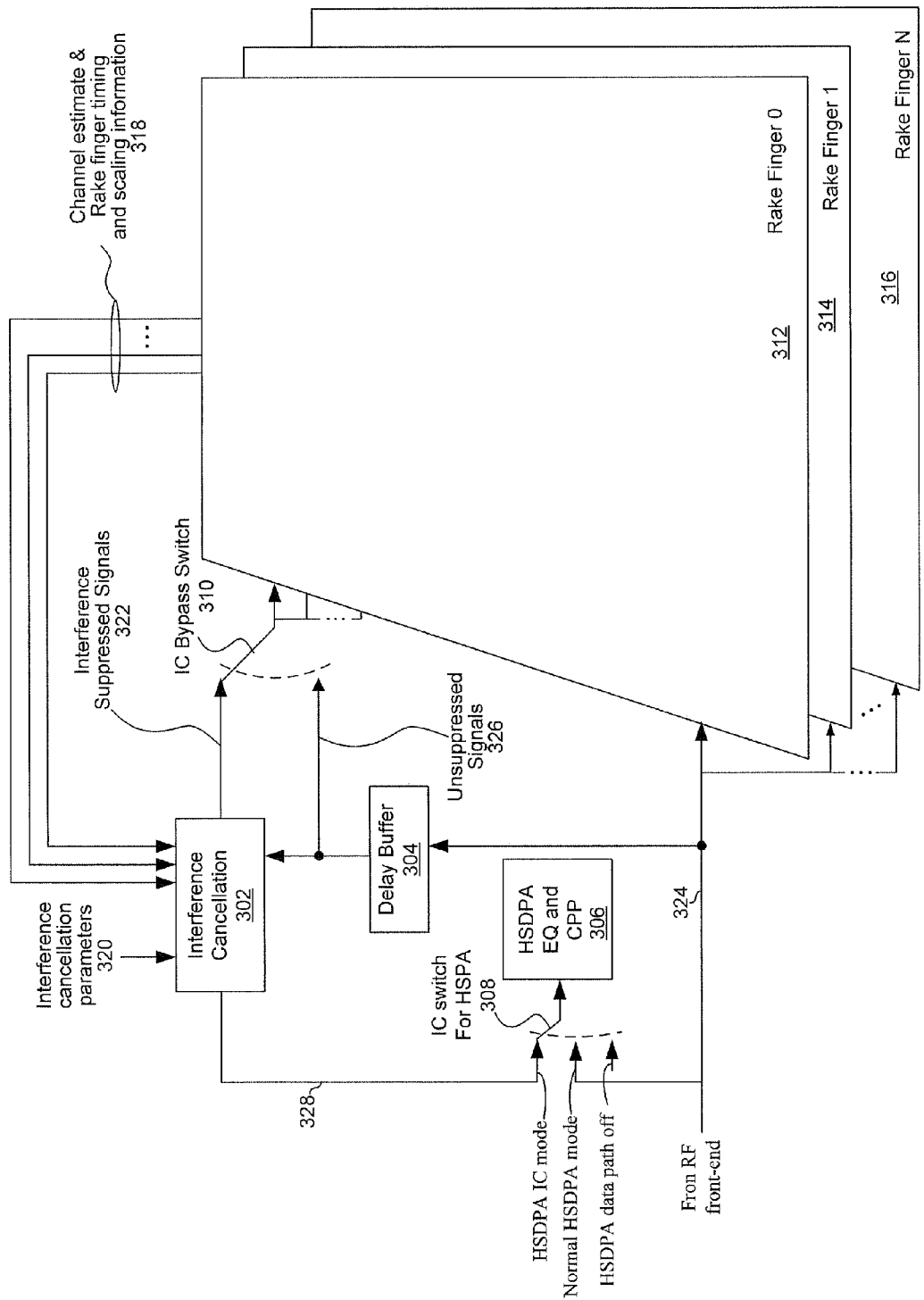
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown a WCDMA receiver 300 comprising an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a burst of a chip-level signal 324 as input at a given input time instant and output it as a burst of a chip-level signal 326 at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As illustrated with respect to FIG. 3, the HSDPA switching device 308 is configured so that it is operable to supply an interference suppressed signal 328, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply the baseband signal 324, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As illustrated with respect to FIG. 3, the IC bypass switching device 310 is configured so that it is operable to supply an interference suppressed signal 322, generated by the interference cancellation module 302, as an input to the rake fingers 312, 314 and 316.

The IC bypass switching device 310 may also be configured so that it is operable to supply a signal 326, which is output from the delay buffer 304, as an input to the rake fingers 312, 314 and 316. The signal 326 output from the delay buffer 304 may comprise a time-delayed, and possibly up-sampled or down-sampled, version of the signal 324 generated by the receiver 202. As indicated in FIG. 3, the signal 326 output from the delay buffer 304 may comprise unsuppressed interference.

Each of the rake fingers 312, 314 and 316 may receive, as input, the chip-level baseband signal 324 generated by the receiver 202. Based on the input baseband signal 324 from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signal 324 received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate, as one or more signals 318, its respective channel estimates, rake finger timing information, scaling factors $K_{fgr}$, scrambling codes associated with one or more BTSs, and/or other information to the interference cancellation module 302.

In various embodiments of the invention, the interference cancellation module 302 may receive chip-level signals 326 from the delay buffer 304. Based on the channel estimates, rake finger timing, and/or other information communicated via the signal(s) 318, the interference cancellation module 302 may select individual multipath signals from the chip-level signals 326 received via the delay buffer 304. Based on the interference cancellation parameters 320, which may be as described with respect to FIG. 2, the interference cancellation module 302 may process the received chip-level multipath signal 326 utilizing an iterative method for interference cancellation, in accordance with an embodiment of the invention.

The chip-level signals 326 received from the delay buffer 304 may comprise a plurality of multipath signals received via one or more receive antennas from one or more transmit antennas of one or more BTSs. The interference cancellation module 302 may be configurable to assign signal processing resources to perform the iterative method of interference cancellation for selected multipath signals. The processor 206 may configure the interference cancellation module 302 to receive multipath signals from one or more transmit antennas of one or more listened and/or non-listened BTSs. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters 320 from the processor 206 and/or from the memory 208. In an exemplary embodiment of the invention, the interference cancellation module 302 may generate and/or retrieve PN sequences and/or OVSF codes from the memory 208. The PN sequences may be generated on the fly based on the code structure utilized by the BTS and/or based on timing information associated with the BTS. The interference cancellation module 302 may retrieve and/or generate a PN sequence for each of the one or more transmit antennas of the one or more BTSs from which the interference cancellation module 302 is configured to attempt to receive a signal and/or for one or more BTSs that are not listened to, but still may interfere with desired signals.

In various embodiments of the invention in which the receiver 202 utilizes a plurality of receiving antennas and/or receives data from a plurality of transmit antennas, data received via the symbol-level signals corresponding to the plurality of receiving antennas and/or transmit antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

Figure 4:
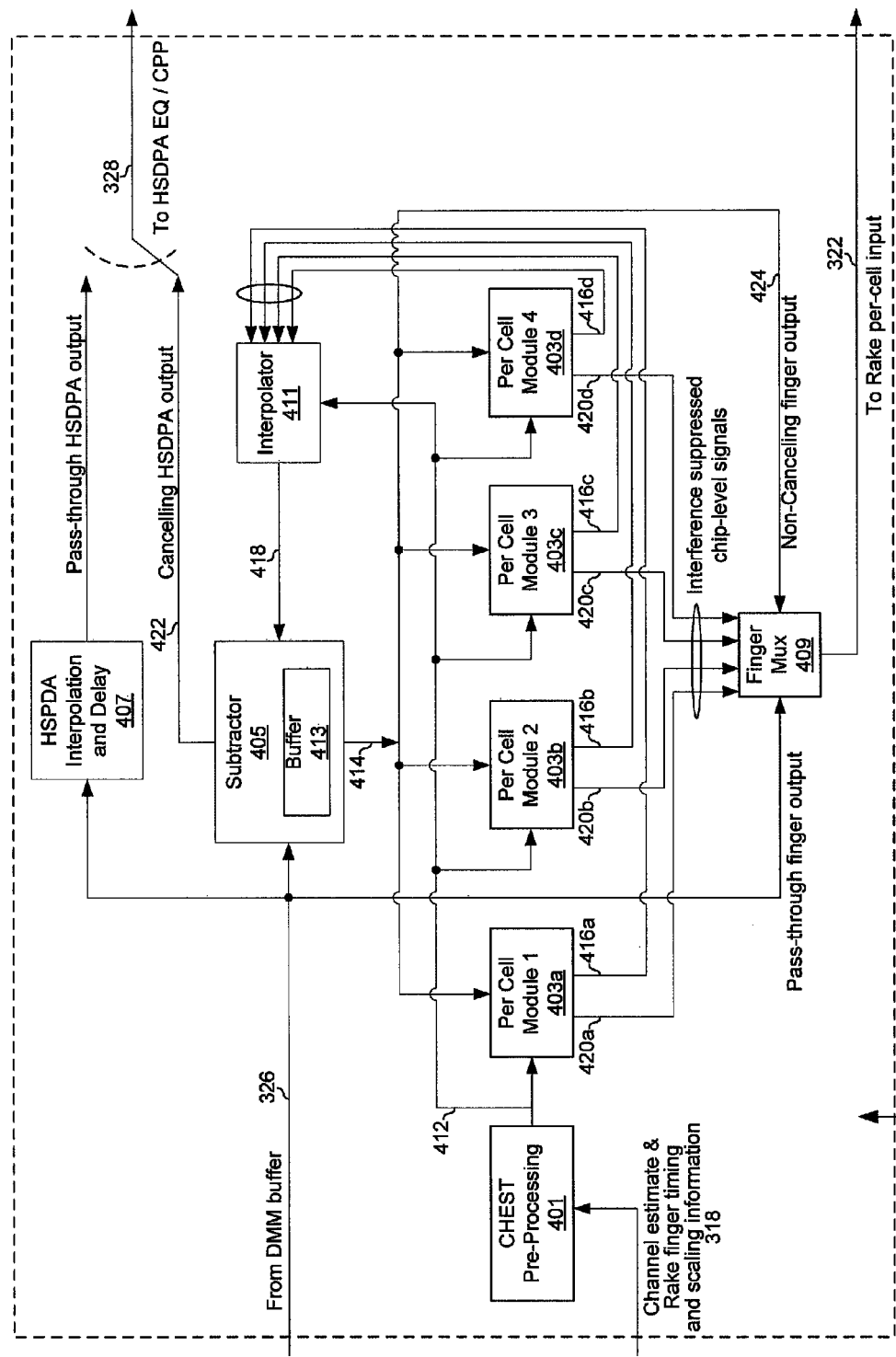
FIG. 4 is a block diagram illustrating an exemplary interference cancellation module, in accordance with an embodiment of the invention.

FIG. 4 is a block diagram illustrating an exemplary interference cancellation module, in accordance with an embodiment of the invention. Referring to FIG. 4, there is shown an interference cancellation module 302 comprising a channel estimate (CHEST) pre-processing block 401, interference cancellation per-cell modules 403A, 403B, 403C, 403D, an interference cancellation subtractor 405, an HSDPA interpolation and delay block 407, a finger MUX 409, and an interpolator 411.

The CHEST pre-processing block 401 may comprise suitable circuitry, logic, interfaces, and/or code that may be operable to normalize channel estimate information input as signal 412 to the Per-Cell Modules 403 and the interpolator 411. The normalization may be based on channel estimate and rake finger timing and scaling information 318 received from the rake fingers 312, 314, and 316.

The subtractor 405 may comprise suitable circuitry, logic, interfaces, and/or code that may be operable to subtract estimated signals from received signals as part of the generation of an interference suppressed version of the received signals.

The subtractor 405 may be operable to receive, as inputs, signals generated by the Per-Cell modules 403A-403D that may be interpolated by the interpolator 411, as well as bursts of the delayed received signal 326 from the delay buffer 304.

The HSDPA interpolation and delay module 407 may comprise suitable circuitry, logic, interfaces, and/or code that may be operable to provide a bypass path for signals received from the delay buffer 304. The HSDPA interpolation and delay module 407 may, for example, interpolate c×2 samples to c×16 samples, and may introduce a delay that equals the delay of the interference cancellation module 302 when operating in interference cancellation mode.

The finger MUX 409 may comprise suitable circuitry, logic, interfaces, and/or code that may be operable to select from the plurality of signals 420 generated by the Per-Cell modules 403A-403D, the input signal from the delay buffer 304, or a non-cancelling finger input 424. In this manner, the finger MUX 409 may enable a pass-through mode, an interference cancelling mode, or a non-cancelling mode. In various embodiments of the invention, the finger MUX 409 may be operable to process the interference suppressed signals 420 generated by the per-cell modules 403A-403D in order to maintain compatibility with legacy rake receivers. In this regard, the signals 420 may be processed based on finger timing information and/or parameters to reintroduce channel effects, such as multipath effects, expected by the rake fingers. In this manner, the interference suppression module 302 may be added to existing rake receiver designs with minimal redesign of existing receiver components.

The interpolator 411 may comprise suitable circuitry, logic, interfaces, and/or code that may be operable to interpolate a received signal, such as a c×1 signal and output a c×2 signal, for example.

The Per-Cell modules 403A-403D may each comprise suitable circuitry, logic, interfaces, and/or code that may be operable to generate an estimate of a multi-user (e.g., WCDMA) and/or multipath chip-level signal transmitted by an associated BTS. The Per-Cell modules 403A-403D may process bursts—256-chip bursts, for example—of a multipath, multi-user signal. In this regard, a received signal 326 processed by the modules 403A-403D may comprise information received via one or more RF paths via one or more receive antennas from one or more transmit antennas of one or more BTSs, each BTS having up to J users. In this regard, each of the modules 403A-403D may be allocated for processing signals from a particular transmit antenna of a particular BTS and a signal from a particular transmit antenna may be received over one or more paths via one or more receive antennas. Accordingly, each of the modules 403A-403D may be operable to compensate for multipath effects, suppress interference from BTSs other than an associated or "serving" BTS, and suppress interference between users of the associated or "serving" BTS.

In an exemplary embodiment of the invention, the four Per-Cell modules 403A-403D may be operable to cancel and/or suppress interference from four non-diversity transmit (Tx) cells, two Tx diversity cells, one Tx diversity cell and two non-Tx diversity cells, one Tx diversity cell with two scrambling codes per antenna, and/or one non Tx-diversity cell that has four scrambling codes. However, the invention need not be so limited, and may support any number of cells depending on the number of Per-Cell modules integrated in the interference cancellation module.

In operation the delayed received signal 326 may be conveyed to the subtractor 405 in bursts, and the bursts may be stored in the residue buffer 413 which may be operable to store, for example, 3×256 chips worth of samples. The residue buffer 413 may also generate polyphase samples for each of the per-cell modules 403A-403D. In an exemplary embodiment of the invention, the signal 326 may be conveyed in 256-chip bursts, with a time between bursts equal to a 256-chip time period. The signal 318 is another input to the interference cancellation module 302 and may comprise the channel estimation, time tracking, and/or scrambling code information from the Rake fingers.

In HSDPA pass-through mode, the signal 326 may be routed via the HSDPA interpolation and delay module 407, which may, for example, interpolate C×2 samples to C×16 samples and introduce a fixed delay that equals the interference cancellation module 320 delay as if operating in HSDPA canceling mode. For pass-through mode, the signal 326 may go directly to the finger MUX 409, where it may be interpolated and delayed before being sent to one or more associated rake fingers such as 312, 314, and 316. The delay may equal the interference cancellation module 320 delay as if the block were operating in canceling mode.

In instances where the interference cancellation module 320 is engaged, where at least one rake finger is in the "canceling mode", or HSDPA is in the canceling mode, the signal 236 may go into the subtractor 405. The interpolator 411 may interpolate the estimated signals 416a-416d output by the per-cell modules 403 and sequentially output the interpolated versions of the estimated signals 416a-416d to the subtractor 405 as signal 418. The subtractor 405 may subtract the interpolated estimated signals 418 from the input signal 326 stored in the buffer 413. The residual signal stored in the residue buffer 413 may be utilized for further signal estimation in the per-cell modules 403A-403D. In this regard, iterative processing may be utilized for interference suppression. The subtractor 405 may also generate the "canceling mode" HSDPA output data stream 422 and the "non-canceling mode" rake finger output data stream 424.

Each of the per-cell modules 403A-403D may be operable to estimate a received signal for each of the J OVSF codes associated with a particular BTS and/or a particular BTS scrambling code. The estimated symbol-level signals for the J codes may be summed up and reconstructed with the channel estimation to convert them back to chip-level signals 416. The chip-level estimated signals 416 may be fed back into the subtractor 405. Each of the per-cell modules 403A-403D may receive scrambling code information, associated finger channel estimation and time tracking information from the CHEST pre-processing module 401 and the output 414 from the subtractor 405. Each of the per-cell modules 403A-403D may be associated with one transmit antenna from a cell. In the case of no Tx diversity, each cell may be associated with one per-cell module; in the case of Tx diversity, the PRISM per-cell module is associated with one transmit antenna out of the two transit antenna of a cell.

Figure 5:
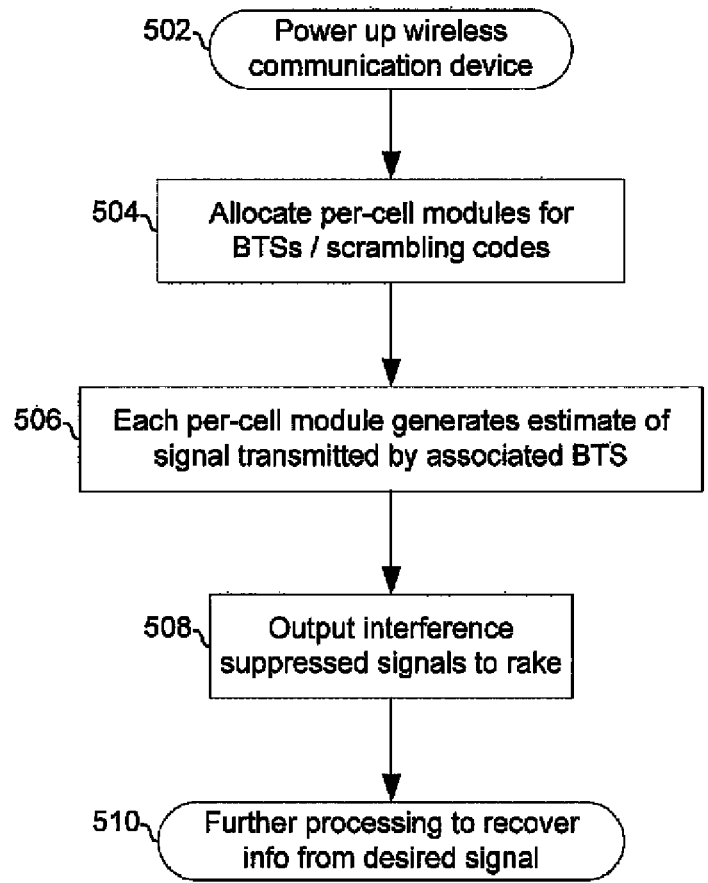
FIG. 5 is a flow chart illustrating exemplary steps for suppressing interference in received signals based on signals received from non-listened BTSs, in accordance with an embodiment of the invention.

FIG. 5 is a flow chart illustrating exemplary steps for suppressing interference in received signals based on signals received from non-listened BTSs, in accordance with an embodiment of the invention. Referring to FIG. 5, the exemplary steps may begin with step 502 in which a wireless communication device, such as the mobile communication devices MU_1 112 and MU_2 114 of FIG. 1, is powered up and begins receiving a raw signal, wherein the raw signal comprises desired and undesired signals. In this regard, the raw signal may comprise signals for one or more users of one or more BTSs, signals from one or more handsets, and/or signals from non-cellular sources. Furthermore, the various signals in the raw signal may each be received via one or more paths. In step 504, logic, circuitry, interfaces, and/or code, such as the per-cell modules 403a-403d, may be allocated for processing the desired and/or undesired signals, each desired and/or undesired signal having been transmitted by a BTS utilizing an associated scrambling code—a PN sequence, for example. That is, in various embodiments of the invention, each of the per-cell modules 403 may be allocated for processing signals associated with a particular BTS scrambling code. In this regard, each of the per-cell modules 403 may be allocated to a serving BTS, a handoff BTS, or a non-listening BTS. Allocation and reallocation of the per-cell modules 403 may be dynamic during operation of the wireless communication device. For example, one or more of the per-cell modules 403 may be allocated and/or reallocated as the mobile communication device travels and one or more BTSs come into range and/or one or more BTSs go out of range.

In step 506, received signals may be iteratively processed to generate an interference suppressed version of the received raw signal. In this regard, each of the per-cell modules 403 may generate one or more estimates of a signal transmitted on its associated scrambling code. In step 508, the interference suppressed signal may be output to the finger MUX which may re-introduce finger timing delays and/or perform other processing to re-introduce channel effects that the rake expects to be present in the signal. In this regard, the re-introduction is performed to be compatible with a legacy rake receiver, and is not necessary in all embodiments of the invention. In step 510, the signal may be further processed to recover the desired signal.

Various aspects of a method and system for interference suppression using information from non-listened base stations are provided. In an exemplary embodiment of the invention, one or more circuits in a wireless communication 114 (FIG. 1), may be operable to receive a raw signal 324 (FIG. 3) comprising one or more desired signals from one or more serving BTSs, such as the BTS 102 (FIG. 1), and comprising one or more undesired signals from one or more non-listened BTSs, such as the BTS 106 (FIG. 1). The one or more circuits may be operable to generate a first estimate signal 420 that estimates the one or more undesired signals as transmitted by the one or more non-listened BTSs, generate an interference suppressed version of the raw signal 324 based on the first estimate signal 420, and recover the one or more desired signals from the interference suppressed version of the raw signal. The one or more non-listened BTSs may comprise BTSs that are not serving the wireless communication device 114 and are not involved in a handoff of the wireless communication device 114. The raw signal 324 may be as received over-the-air and may comprise, for example, signals for one or more users of one or more BTSs, signals from one or more handsets, and/or signals from non-cellular sources. Furthermore, the various signals that make up the raw signal may each be received via one or more paths. Generating the first estimate signal 420 may comprise generating a plurality of potential user signals from the one or more undesired signals received from the one or more non-listened BTSs 106, and scaling each of the plurality of potential user signals by a corresponding one of a plurality of scaling factors, z. The scaling factors, z, may be generated based on power and noise detected in the plurality of potential user signals.

A first portion of the one or more circuits in the wireless communication device 114 may be dynamically allocated for processing the one or more desired signals received from the one or more serving BTSs, such as the BTS 102, and a second portion of the one or more circuits in the wireless communication device 114 may be dynamically allocated for processing the one or more undesired signals received from the one or more non-listened BTSs, such as the BTS 106. The first portion of the one or more circuits may be configured based on one or more scrambling codes associated with the one or more serving BTSs. The second portion of the one or more circuits may be configured based on one or more scrambling codes associated with the one or more non-listened BTSs. A third portion of the one or more circuits may be dynamically allocated for processing one or more undesired signals received from one or more serving BTSs. The third portion of the one or more circuits may generate second estimate signals 420 that estimate the one or more undesired signals transmitted by the one or more serving BTSs, and the interference suppressed version of the raw signal may be generated based on the second estimate signals. A third portion of the one or more circuits in the wireless communication device 104 may be dynamically allocated for processing undesired signals received from one or more handoff BTSs, such as the BTS 104 (FIG. 1). The third portion of the one or more circuits may generate second estimate signals that estimate one or more undesired signals received from one or more handoff BTSs, and the interference suppressed version of the raw signal may be generated based on the second estimate signals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for interference suppression using information from non-listened base stations.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing in a wireless communication device, comprising:
    receiving, by the wireless communication device, a raw signal including a desired signal from a serving base transceiver station (BTS) and an undesired signal from a non-listened BTS, wherein the non-listened BTS includes a BTS that is not serving the wireless communication device and is not involved in a handoff of the wireless communication device;
    allocating, by the wireless communication device, a first portion of the wireless communication device to the serving BTS and a second portion of the wireless communication device to the non-listened BTS;
    processing, by the first portion, the desired signal;
    processing, by the second portion, the undesired signal;
    generating, by the second portion, a first estimate signal that estimates the undesired signal
    generating, by the second portion, an interference suppressed version of the raw signal based on the first estimate signal; and
    recovering, by the wireless communication device, the desired signal from the interference suppressed version of the raw signal.

2. The method according to claim 1, wherein the step of allocating comprises:
    allocating the first portion based on a scrambling code corresponding to the serving BTS.

3. The method according to claim 1, wherein the step of allocating comprises:
    allocating the second portion based on a scrambling code corresponding to the non-listened BTS.

4. The method according to claim 1, further comprising allocating a third portion of the wireless communication device corresponding to the serving BTS; and
    processing, by the third portion, a second undesired signal received from the serving BTS.

5. The method according to claim 4, further comprising:
    generating, by the third portion, a second estimate signal that estimates the second undesired signal; and
    generating, by the third portion, the interference suppressed version of the raw signal based on the second estimate signal.

6. The method according to claim 1, wherein the step of allocating further comprises:
    allocating a third portion of the wireless communication device corresponding to a handoff BTS; and
    processing, by the third portion, a second undesired signal received from the handoff BTS.

7. The method according to claim 6, further comprising:
    generating, by the third portion, a second estimate signal that estimates the second undesired signal; and
    generating, by the third portion, the interference suppressed version of the raw signal based on the second estimate signal.

8. The method according to claim 1, wherein the step of generating the first estimate signal comprises:
    generating a plurality of potential user signals from the undesired signal; and
    scaling the plurality of potential user signals by a corresponding plurality of scaling factors.

9. The method according to claim 8, comprising:
    generating the plurality of scaling factors based on a power level and a noise level in the plurality of potential user signals.

10. A wireless communication device, comprising:
    a receiver configured to receive a raw signal comprising including a desired signal from a serving base transceiver station (BTS) and an undesired signal from a non-listened BTS, wherein the non-listened BTS includes a BTS that is not serving the wireless communication device and is not involved in a handoff of the wireless communication device;

an interference cancellation module configured to:
generate a first estimate signal that estimates the undesired signal; and
generate an interference suppressed version of the raw signal based on the first estimate signal; and a processor configured to:
allocate a first portion of the interference cancellation module to the serving BTS and a second portion of the interference cancellation module to the non-listened BTS; and
recover the desired signal from the interference suppressed version of the raw signal.

11. The wireless communication device according to claim 10, wherein the processor is further configured to allocate the first portion based on a scrambling code corresponding to the serving BTS.

12. The wireless communication device according to claim 10, wherein the processor is further configured to allocate the second portion based on a scrambling code corresponding to the non-listened BTS.

13. The wireless communication device according to claim 10, wherein the processor is further configured to allocate a third portion of the interference cancellation module corresponding to a second undesired signal received from a serving BTS.

14. The wireless communication device according to claim 13, wherein the third portion of the interference cancellation module is further configured to:
generate a second estimate signal that estimates the second undesired signal; and
generate the interference suppressed version of the raw signal based on the second estimate signal.

15. The wireless communication device according to claim 10, wherein the processor is further configured to allocate a third portion of the interference cancellation module corresponding to a second undesired signal received from a handoff BTS.

16. The wireless communication device according to claim 15, wherein the third portion of the interference cancellation module is further configured to:
generate a second estimate signal that estimates the second undesired signal; and
generate the interference suppressed version of the raw signal based on the second estimate signal.

17. The wireless communication device according to claim 10, wherein the interference cancellation module is further configured to generate the first estimate signals by:
generating a plurality of potential user signals from the undesired signal; and
scaling the plurality of potential user signals by a corresponding plurality of scaling factors.

18. The wireless communication device according to claim 17, wherein the interference cancellation module is further configured to:
generate the plurality of scaling factors based on a power level and a noise level detected in the plurality of potential user signals.

19. A wireless communication device, comprising:
a receiver configured to receive a raw signal including a desired signal and an undesired signal from a plurality of base transceiver stations (BTSs), each BTS being from among the plurality of BTSs transmitting the desired signal or the undesired signal utilizing a corresponding scrambling code;
a processor configured to allocate a per cell module from among a plurality of per cell modules to a corresponding BTS based on the corresponding scrambling code, wherein
the per cell modules are configured to generate an estimate signal that estimates the undesired signal, and to generate an interference suppressed version of the raw signal based on the estimate signal, and wherein
the processor is further configured to recover the desired signal from the interference suppressed version of the raw signal.

20. The wireless communication device of claim 19, wherein a BTS from among the plurality of BTSs comprises:
a serving BTS;
a handoff BTS; or
a non-listening BTS, the non-listening BTS including a BTS that is not serving the wireless communication device and is not involved in a handoff of the wireless communication device.

* * * * *

UNITED STATES PATENT AND TRADEMARK OFFICE
CERTIFICATE OF CORRECTION

PATENT NO. : 8,311,484 B2　　　　　　　　　　　　　　　　　　　　　　　Page 1 of 1
APPLICATION NO. : 12/573803
DATED : November 13, 2012
INVENTOR(S) : Hahm et al.

It is certified that error appears in the above-identified patent and that said Letters Patent is hereby corrected as shown below:

Column 5, line 23, please replace "BTS n 104" with --BTS B 104--.
    Column 5, lines 66-67, please replace "BTS 106" with --BTS C 106--.
    Column 18, line 14, please replace "signal" with --signal;--.
    Column 18, line 63, please replace "signal comprising" with --signal--.

Signed and Sealed this
Fifth Day of February, 2013

Teresa Stanek Rea
*Acting Director of the United States Patent and Trademark Office*